United States Patent
Stemmer et al.

(10) Patent No.: US 10,118,515 B2
(45) Date of Patent: Nov. 6, 2018

(54) ADJUSTER DEVICE HAVING A FIXED ELEMENT, AN ADJUSTABLE ELEMENT AND A FIRST LOCKING DEVICE

(71) Applicant: Johnson Controls GMBH, Burscheid (DE)

(72) Inventors: Jürgen Stemmer, Remscheid (DE); Dmitrij Gerdt, Köln (DE)

(73) Assignee: JOHNSON CONTROLS GMBH, Burscheid (DE)

( * ) Notice: Subject to any disclaimer, the term of this patent is extended or adjusted under 35 U.S.C. 154(b) by 188 days.

(21) Appl. No.: 14/392,128

(22) PCT Filed: Jun. 27, 2014

(86) PCT No.: PCT/EP2014/063694
§ 371 (c)(1),
(2) Date: Dec. 23, 2015

(87) PCT Pub. No.: WO2014/207201
PCT Pub. Date: Dec. 31, 2014

(65) Prior Publication Data
US 2016/0193945 A1    Jul. 7, 2016

(30) Foreign Application Priority Data

Jun. 28, 2013  (DE) .................. 10 2013 212 749
Aug. 16, 2013  (DE) .................. 10 2013 013 510

(51) Int. Cl.
*B60N 2/04* (2006.01)
*B60N 2/44* (2006.01)
(Continued)

(52) U.S. Cl.
CPC .............. *B60N 2/442* (2013.01); *B60N 2/04* (2013.01); *B60N 2/1685* (2013.01); *B60N 2/919* (2018.02); *B60N 2002/957* (2018.02)

(58) Field of Classification Search
CPC ............ G05G 5/005; G05G 5/02; G05G 5/04; G05G 5/28; G05G 5/14; G05G 5/20;
(Continued)

(56) References Cited

U.S. PATENT DOCUMENTS 5,245,727 A   9/1993  Sasaki
6,230,867 B1  5/2001  Schwarzbich
(Continued)

FOREIGN PATENT DOCUMENTS

DE    8218024 U1   11/1982
DE    4008438 A1    5/1991
(Continued)

OTHER PUBLICATIONS

Machine Translation of DE 10 2013 015 500, obtained Jan. 17, 2018.*
(Continued)

*Primary Examiner* — Richard W Ridley
*Assistant Examiner* — Brian J McGovern
(74) *Attorney, Agent, or Firm* — The Dobrusin Law Firm, P.C.

(57) ABSTRACT

The present invention proposes an adjuster device (1) having a fixed element (20), an adjustable element (10) and a first locking device, wherein the adjustable element is mounted rotatably around a central axis (2) relative to the fixed element and the adjustable element can be locked relative to the fixed element by the first locking device, wherein the adjuster device comprises a second locking device as a security device, wherein the second locking device comprises an adapter plate (11) and a locking element (21), wherein the locking element is non-rotatably arranged on the fixed element and the adapter plate is arranged rotatably around the central axis, wherein in the locking position a disengaging movement of the non-rotatable locking element (Continued)

along an axis running parallel to the central axis is prevented by the adapter plate, wherein the adjustable element can be driven by the adapter plate and wherein the adapter plate and the adjustable element are configured in such a manner that, during the transition from a locking position into a non-locking position, the adapter plate releases the path of the locking element for the disengaging movement and the adjustable element can be driven in such a manner that the rotation of the adjustable element causes the disengaging movement, wherein the adjustable element can be rotated relative to the fixed element before the disengaging movement is released for the locking element.

3 Claims, 13 Drawing Sheets

(51) Int. Cl.
*B60N 2/16* (2006.01)
*B60N 2/90* (2018.01)

(58) Field of Classification Search
CPC ........ G05G 5/12; G05G 2505/00; B60N 2/08; B60N 2/442; B60N 2/04; B60N 2/1685; B60N 2/168; B60N 2/1892; B60N 2/123; B60N 2/146; B60N 2/2245; B60N 2/366; B60N 2/4811; B60N 2/4841; B60N 2/444; B60N 2/1889; B60N 2/2227; B60N 2/2254; B60N 2/167; B60N 2/169; B60N 2/1882; B60N 2/1896; B60N 2/224; B60N 2/2258; B60N 2/4445; B60N 2/0875; B60N 2/2218; B60N 2002/446; B60N 2002/4455; B60N 2002/445; B60N 2002/4465; B60N 2002/447; B60N 2002/4475
See application file for complete search history.

(56) References Cited

U.S. PATENT DOCUMENTS

| | | | |
|---|---|---|---|
| 7,097,250 B2 | 8/2006 | Rausch et al. | |
| 8,454,092 B2 | 6/2013 | Thiel | |
| 9,764,666 B2 * | 9/2017 | Stemmer | B60N 2/444 |
| 2017/0291513 A1 * | 10/2017 | Stemmer | B60N 2/168 |

FOREIGN PATENT DOCUMENTS

| | | | | |
|---|---|---|---|---|
| DE | 4214979 A1 | 4/1993 | | |
| DE | 10242032 A1 | 3/2004 | | |
| DE | 10340877 A1 | 3/2004 | | |
| DE | 10338306 A1 | 3/2005 | | |
| DE | 102006003243 A1 | 8/2007 | | |
| DE | 102006001530 B4 | 4/2009 | | |
| DE | 102008008936 B3 | 6/2009 | | |
| DE | 202008001597 U1 | 7/2009 | | |
| DE | 202008008312 U1 | 12/2009 | | |
| DE | 202009002580 U1 | 8/2010 | | |
| DE | 102010018786 A1 | 10/2011 | | |
| DE | 102011119390 A1 | 5/2013 | | |
| DE | 102013015500 A1 * | 1/2015 | ........... | B60N 2/2227 |
| DE | 102014222642 A1 * | 3/2016 | ............. | B60N 2/168 |
| EP | 1390226 B1 | 2/2004 | | |
| JP | 2005-325906 A | 11/2005 | | |
| WO | 9941101 A1 | 8/1999 | | |

OTHER PUBLICATIONS

Machine Translation of DE 10 2014 222 642, obtained Jun. 20, 2018.*
Korean Office Action for Korean Application No. 10-2016-7002429, dated Jun. 19, 2017.
International Search Report for International Application No. PCT/EP2014/063694, dated Sep. 29, 2014.
German Examination Report for German Application No. 102013013510.9, dated Apr. 28, 2014.
English Translation of the International Preliminary Report on Patentability for Application No. PCT/EP2014/063694 dated Jan. 7, 2016.

* cited by examiner

ADJUSTER DEVICE HAVING A FIXED ELEMENT, AN ADJUSTABLE ELEMENT AND A FIRST LOCKING DEVICE

PRIOR ART

The present invention is based on an adjuster device for adjusting a motor vehicle component.

Such adjuster devices in each case have a locking device which ensures that the adjuster device is blocked on account of a frictional connection between a braking ring and braking elements. The blocking is canceled only when an adjustment movement is initiated by the user. In the event of the presence of vibrations, there is the risk of an inadvertent adjustment of the motor vehicle component occurring despite the frictional connection.

DISCLOSURE OF THE INVENTION

It is the object of the present invention to provide an adjuster device having a fixed element, an adjustable element and a first locking device, wherein the adjuster device additionally has a means which prevents the adjustable element from running off in relation to the fixed element. In order to achieve the object, the intention is to provide the means here in such a manner that the adjustable element can be directly adjusted as soon as the user actuates the adjuster device for adjusting the adjustable element.

The object is achieved by an adjuster device having a fixed element, an adjustable element and a first locking device, wherein the adjustable element is mounted rotatably about a central axis relative to the fixed element and the adjustable element is lockable relative to the fixed element by the first locking device, wherein the adjuster device has a second locking device for run-off protection, wherein the second locking device comprises an adapter plate and a blocking element, wherein the blocking element is arranged non-rotatably on the fixed element and the adapter plate is arranged rotatably about the central axis, wherein, in a blocking situation, a disengaging movement of the blocking element along an axis running parallel to the central axis is prevented in a form-fitting manner by the adapter plate, and wherein the adapter plate and the adjustable element are configured in such a manner that, during the transition from a blocking situation into a non-blocking situation, the adapter plate releases (by means of a rotational movement) the path for the disengaging movement for the blocking element (i.e. blocking element and adapter plate can no longer interact in a form-fitting manner in a direction running parallel to the central axis), and the adjustable element is drivable in such a manner that the rotation of the adjustable element brings about the disengaging movement. In particular, it is provided that the adjustable element is rotatable relative to the fixed element before the disengaging movement for the blocking spring element is released.

The adjuster device according to the invention has the advantage over the prior art that the adjustable element is already adjustable during the transition from the blocking situation into the non-blocking situation, i.e. it is not necessary first for a movement which is associated with an idling motion or forward motion and precedes the adjustment movement of the adjustable element to be carried out. In an advantageous manner, the adjustable element can therefore be actuated directly. A further advantage is that, under some circumstances, it is possible to dispense with additional mechanical connections which realize a temporally delayed start of the adjustment movement of the adjustable element. In addition to the additional costs which are incurred because of the additional mechanical connections (for example pins or similar structures), in the case of such mechanical connections there is always also the risk of tilting or breaking off if said connections are intended to carry along the adjustable element after a certain idling distance. This risk exists in particular if the adjuster device is actuated repeatedly over a prolonged period of time.

The adjuster device is typically part of a motor vehicle component and, in the case of the first locking device, is preferably a friction brake. Furthermore, the adapter plate is customarily connected to an actuating means, such as, for example, a lever arm or the like.

In a further preferred embodiment, it is provided that the adjustable element is drivable via the adapter plate. As a result, in an advantageous manner, the rotational movement of the adapter plate is synchronized with the rotational movement of the adjustable part. In particular, it is ensured, in this embodiment, that the adjustable element is adjustable as soon as the adapter plate is actuated.

In a further embodiment, it is provided that the adapter plate comprises a blocking bolt and the blocking element comprises a projection, wherein, in a blocking situation, blocking bolt and projection are arranged one above the other along a direction running parallel to the central axis and, during the transition from the blocking situation into the non-blocking situation, are arranged offset with respect to each other along a direction running parallel to the central axis. As a result, it is possible, in an advantageous manner, to realize an arrangement with blocking bolt and projection, which prevents the path for the disengaging movement being released for the blocking element, in particular for the projection thereof, in the blocking situation. In particular, it is provided that, in the blocking situation, the adapter plate directly or indirectly interacts in a form-fitting manner with the blocking element such that a disengaging movement cannot take place or the disengaging movement is suppressed. In an advantageous manner, projection and adapter plate can be configured in a flexible manner and adapted to different structural specifications of the adjuster device.

In a preferred embodiment, it is provided that the adapter plate has an adapter plate web with the blocking bolt, wherein the adapter plate and the adapter plate web are configured in such a manner that, when the adapter plate is actuated, the adapter plate web is moved with a temporal delay with respect to the adapter plate. This can be realized, for example, by means of a slot and pin construction, wherein the pin is arranged on the adapter plate and the slot on the adapter plate web, as a result of which the adapter plate carries along the adapter plate web only after an idling distance, i.e. with a time delay. As a result, the blocking bolt on the adapter plate web also only releases the path for the disengaging movement for the blocking element with a time delay. This advantageously realizes an adjuster device in which the adjustable element is rotatable before the path for the disengaging movement of the blocking element is released. It is also conceivable for the adapter plate and the adapter plate web to be two individual parts which are mounted rotatably about the central axis, wherein the adapter plate and the adapter plate web are configured in such a manner that the adapter plate carries along the adapter plate web after an idling distance and, as a result, the blocking bolt on the adapter plate web releases the path for the disengaging movement for the blocking element only with a time delay.

In a further embodiment, it is provided that the adjustable element has a toothed structure, wherein, in the blocking situation, the toothed structure interacts in a form-fitting manner with the blocking element in a direction running perpendicular to the central axis such that the rotation of the adjustable element about the central axis is restricted. It is also provided that, during the transition from the blocking situation into the non-blocking situation, the rotation of the toothed structure brings about or causes the disengaging movement. As a result, in an advantageous manner, the rotational movement of the adjustable part can already be begun even if the disengaging movement has not yet finished. In particular, it is provided that the teeth have an oblique surface which, during the transition from the blocking situation into the non-blocking situation, serves as a ramp for the projection, along which the projection is moved when the toothed structure rotates. That is to say, it is provided that during the rotation of the adjustable element, the disengaging movement is brought about by the interaction of ramp and toothed structure. In other words: unlocking takes place via the output side of the ramp if the disengaging movement is not prevented by the adapter plate, in particular the blocking bolt thereof.

In a further embodiment, it is provided that the adapter plate takes up a primary position in the blocking situation and in the non-blocking situation and takes up a secondary position during the transition from the blocking situation into the non-blocking situation. It can thus advantageously be determined via the position of the adapter plate when a transition from the blocking situation into the non-blocking situation or from the non-blocking situation into the blocking situation takes place.

In a further embodiment, it is provided that the adjuster device comprises a spiral spring, wherein the adapter plate is transferrable from one of the secondary positions into the primary position by the resetting force of the spiral spring. As a result, the adapter plate advantageously does not have to be returned manually into the primary position.

In a further embodiment, it is provided that the adapter plate and the blocking element are designed in such a manner that, after the disengaging movement is finished, the blocking element is prevented from carrying out an engaging movement. It is thereby prevented in an advantageous manner that the blocking element returns inadvertently again into the position which it takes up for the blocking situation.

In a further embodiment, it is provided that the blocking element comprises a blocking spring element, wherein, in the blocking situation, the blocking spring element interacts in a form-fitting manner along a direction running parallel to the central axis with the adapter plate, in particular with the blocking bolt of the adapter plate, and, in the non-blocking situation, interacts in a force-fitting manner with the adapter plate such that an engaging movement is prevented. In an advantageous manner, it is thus prevented, without additional means or device, that the blocking element inadvertently returns again into the position which it takes up for the blocking situation. It is also conceivable for the blocking spring not to be forcibly prevented from the engaging movement.

In a further embodiment, it is provided that the blocking spring element is a leaf spring. Leaf springs can advantageously be integrated in a space-saving manner in the adjuster device at the blocking element. In an alternative embodiment, the blocking spring element is a leg spring, a tension spring or compression spring. In particular, it is also conceivable for the blocking spring element to be movable in a direction perpendicular to the central axis, preferably radially away from the central axis or radially toward the central axis, or for the resetting force to act in such a radial direction. It is also conceivable here for the blocking spring element to be substantially arranged in the region extending between central axis and the toothed structure.

Advantageous refinements and developments of the invention can be gathered from the dependent claims and the description with reference to the drawings.

Further details, features and advantages of the invention emerge from the drawings and from the description below of preferred embodiments with reference to the drawings. The drawings here merely illustrate exemplary embodiments of the invention which do not restrict the essential inventive concept.

EMBODIMENTS OF THE INVENTION

In the various figures, identical parts are always provided with the same reference signs and are therefore generally also only named or mentioned once in each case.

Figure 1:
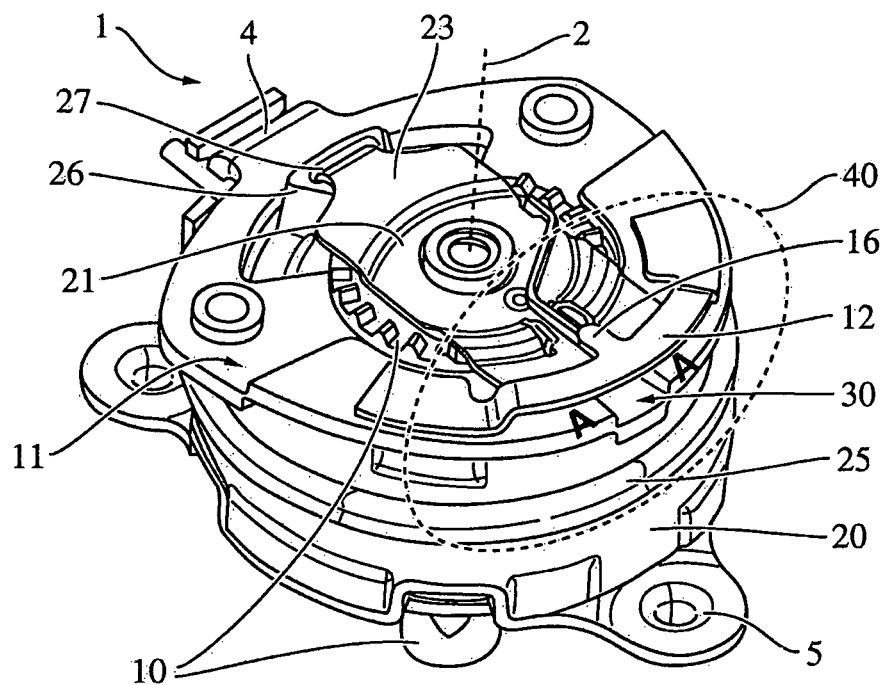
FIG. 1 shows a view of an adjuster device 1 according to a first exemplary embodiment of the present invention.

FIG. 1 illustrates a schematic view of an adjuster device 1 according to a first exemplary embodiment of the present invention for a motor vehicle component (not illustrated).

The adjuster device 1 here is customarily fastened to the motor vehicle component via fastening devices 5. The adjuster device 1 typically has a fixed element 20 and an adjustable element 10, wherein the adjustable element 10 is mounted rotatably about a central axis 2 relative to the fixed element 20. As a result, the relative position between the fixed element 20 and the adjustable element 10 can be changed. In the interior of the adjuster device 1, the adjuster device 1 has a first locking device (not illustrated) which ensures that the adjustable element 10 is locked in a desired position, in particular desired rotational position, in relation to the fixed element 20. The fixed element 20 customarily forms at least part of the housing of the adjuster device 1. The first locking device is preferably a friction brake. For run-off protection, the adjuster device 1 has, according to the invention, a second locking device in addition to the first locking device. The second locking device comprises an adapter plate 11 and a blocking element 21. It is provided here that, in a blocking situation, the second locking device prevents the adjustable element from running off in relation to the fixed element 20 and, in a non-blocking situation, permits the adjustable element 20 to be adjusted in relation to the fixed element 20. The adapter plate 11 is mounted rotatably about the central axis 2 and takes up a primary position in the blocking situation and a secondary position differing from the primary position in a non-blocking situation. Furthermore, the adapter plate 11 comprises a tab 4 which projects over the edge of the fixed element 20 or of the housing, wherein the tab 4 can be brought into operative connection with a spiral spring 25 surrounding the fixed element 20. The spiral spring 25 allows a restoring force to act on the adapter plate 11 when the adapter plate 11 is rotated out of the primary position thereof. It is also conceivable for another type of spring or another elastically deformable structural element, for example a rubber band, to exert a restoring force on the adapter plate and to cause (without an opposing outer action of force) the adapter plate to return into the position which the unactuated adapter plate 11 takes up. Furthermore, in the form illustrated in FIG. 1, the adapter plate 11 comprises an adapter plate web 12. The adapter plate web 12 is designed as a bridge-like elevation with respect to the general extent of the basic body of the adapter plate, as a result of which a clearance 30 is formed between adapter plate web 12 and basic body of the adapter plate. It is also conceivable for the basic body of the adapter plate to have an empty point below the adapter plate web, or for the basic body of the adapter plate 11 to be arched and perforated in such a manner that the basic body of the adapter plate 11 itself already forms a type of adapter plate web. Furthermore, the adapter plate 11 has a blocking bolt 16 which substantially extends in a plane running perpendicular to the central axis and is arranged above the clearance 30. The blocking bolt 16 is preferably arranged on the adapter plate web 12. Furthermore, it is provided that the adjustable element 10 is drivable via the adapter plate 11. In the embodiment illustrated in FIG. 1, the adjustable element 10 has a toothed structure 13, wherein the individual teeth are arranged symmetrically about the central axis 2. The adapter plate 11 and the adjustable element 10 with the toothed structure 13 form, together with the blocking element 21, the main components of the second locking device. The blocking element 21 is arranged on the fixed element in such a manner that said blocking element is mounted substantially non-rotatably about the central axis 2, i.e. is substantially non-rotatable about the central axis 2. However, it is provided that the blocking element 21 is at least partially deformable and/or tiltable in a direction running parallel to the central axis 2. In FIG. 1, the blocking element 21 is connected via a further tab 27 to a recess 26 in the housing or in the fixed element 20 in such a manner that rotation of the blocking element 21 about the central axis 2 is substantially suppressed. However, it is also conceivable for the locking element 21 to be connected non-rotatably to the housing or to the fixed element 20 in another way. In the embodiment illustrated, the blocking element 21 furthermore comprises a blocking element base plate, the main plane of extent of which extends substantially perpendicular to the central axis in a blocking situation. In addition, the blocking element comprises a blocking spring element 22, wherein the blocking spring element 22 has a first spring end and a second spring end. The blocking spring element 22 is fixedly connected here at the first spring end to the blocking element base plate and can be tensioned or deflected in a direction running perpendicular to the central axis 2. It is also conceivable for the blocking spring element 22 to be arranged on the adapter plate 11. In the embodiment illustrated, the blocking spring element 22 is a leaf spring. The blocking spring element 22 extends in the untensioned or relaxed case over the toothed structure 13 until under the clearance 30 below the adapter plate web 12. In particular, the second spring end is arranged below the blocking bolt 16 in the blocking situation. Furthermore, the blocking element basic surface has a projection 24, wherein, in the blocking situation, said projection 24 is arranged between two teeth of the toothed structure and part of the blocking spring element. As a result, a part of the toothed structure, a part of the blocking spring and the projection lie in a plane which runs parallel to the central axis and parallel to the line A-A. The region within the dashed line in FIG. 1 is referred to below as the blocking region.

Figure 2:
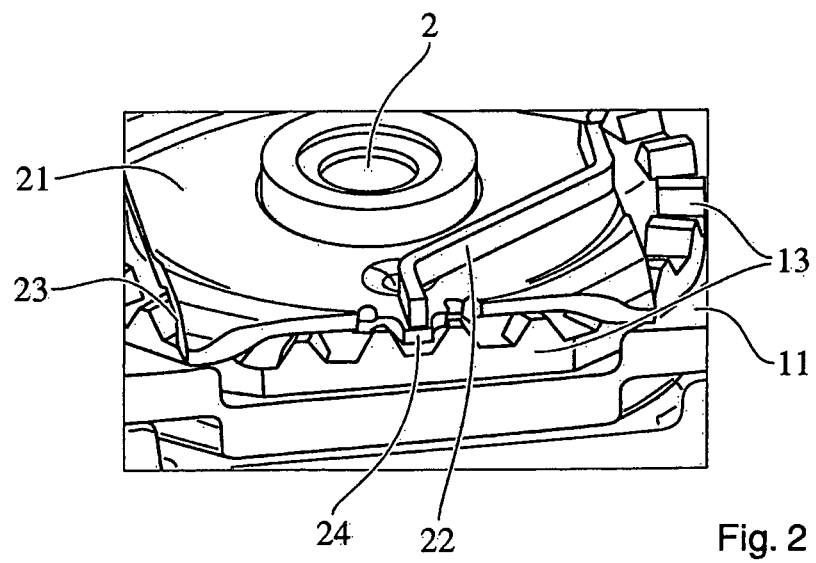
FIG. 2 shows a first schematic cross-sectional view along a plane which runs parallel to a central axis and parallel to the line A-A from FIG. 1.

FIG. 2 illustrates a schematic view along the plane which runs parallel to the central axis 2 and parallel to the line A-A from FIG. 1. From the top downward, a part of the blocking spring element 22, a part of the adjustable element 10 with the toothed structure 13 and the projection 24 are arranged in said plane. It can be gathered from the figure that the blocking element base plate has an arching, below which the toothed structure is arranged. In particular, the arching is configured in such a manner that, during rotation about the central axis, the toothed structure is movable below the arching as in a tunnel. It is provided that the teeth of the toothed structure 13 have oblique surfaces. The oblique surfaces are inclined in such a manner that they form a ramp for the projection of the blocking element base plate when the adjustable element and therefore the toothed structure 13 rotate about the central axis 2. In other words, in FIG. 2 which is illustrated (without adapter plate 11), rotation of the adjustable element would lead to rotation of the toothed structure. During rotation of the toothed structure, the oblique surfaces of the toothed structure press against the projection of the blocking element 21 in such a manner that a disengaging movement from the tiltable or deformable blocking element base plate is carried out. The disengaging movement takes place here in a direction running substantially parallel to the central axis 2.

Figure 3:
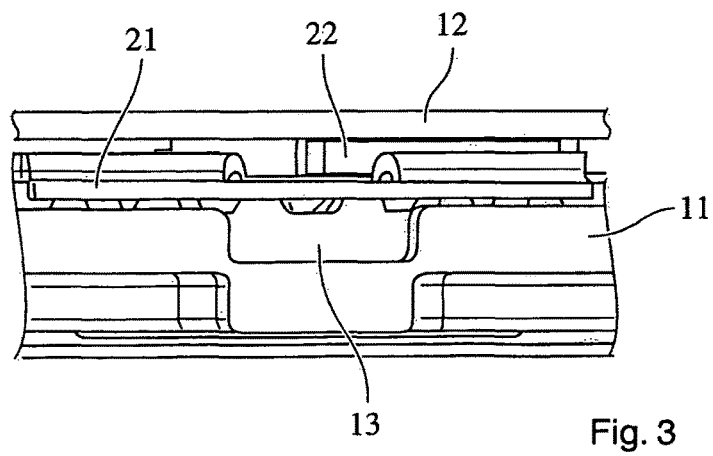
FIG. 3 shows a second schematic cross-sectional view from a blocking region of an adjuster device according to the exemplary first embodiment of the present invention in the blocking situation.
Figure 4:
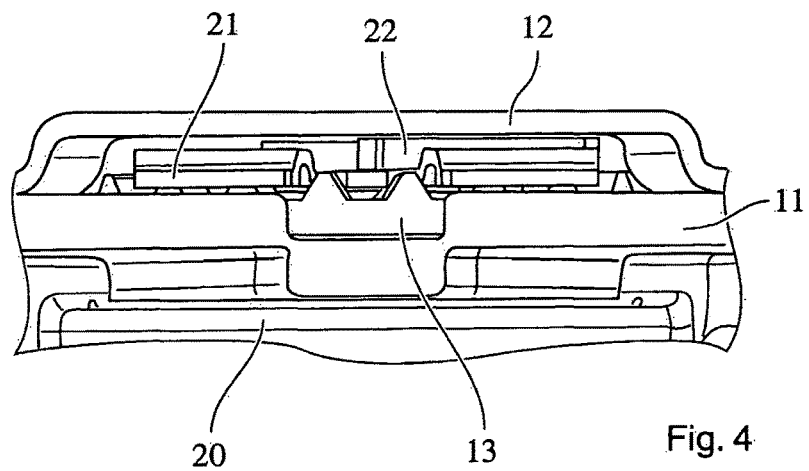
FIG. 4 shows a third schematic cross-sectional view from the blocking region of an adjuster device according to the exemplary first embodiment of the present invention in the blocking situation.

FIG. 3 and FIG. 4 illustrate two schematic cross-sectional views from the blocking region of an adjuster device according to the exemplary embodiment of the present invention when the second locking device is in the blocking situation. In addition to the toothed structure 13 of the adjustable element 1, the blocking spring element 22 and the blocking element base plate, the adapter plate and in particular the adapter plate web, which together form the clearance 30, are also illustrated. In the illustrated primary position of the adapter plate 11, the blocking bolt interacts with the blocking spring element and therefore also with the projection in a form-fitting manner in a direction running parallel to the central axis. As a result, the projection is not capable of carrying out the disengaging movement with the aid of the ramp in a run-off movement. Instead, the projection interacts in a form-fitting manner in a direction running perpendicular to the central axis 2 with one of the adjacent teeth and thereby prevents the adjustable element from running off in relation to the fixed element.

Figure 5:
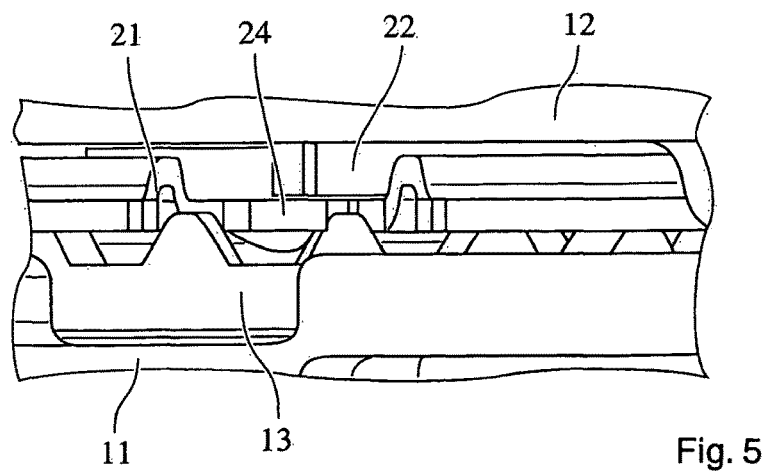
FIG. 5 shows a fourth schematic cross-sectional view from the blocking region of an adjuster device according to the exemplary first embodiment of the present invention during a first phase of the transition from the blocking situation into a non-blocking situation.
Figure 6:
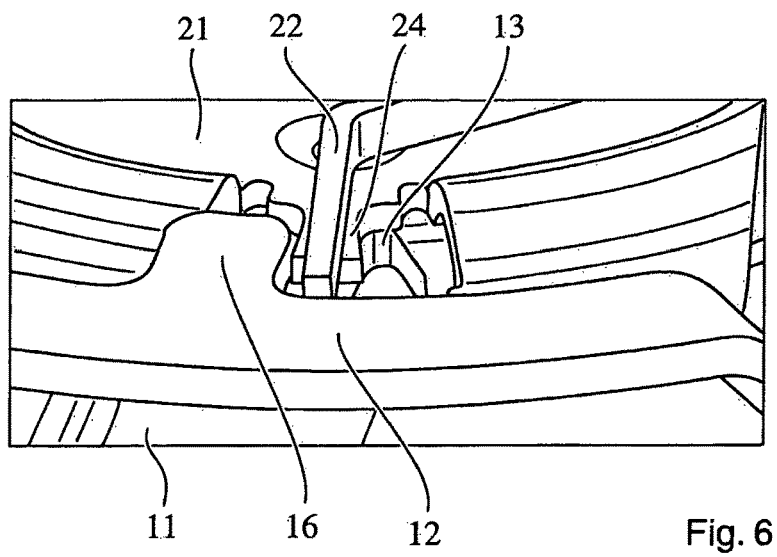
FIG. 6 shows a fifth schematic cross-sectional view from the blocking region of an adjuster device according to the exemplary first embodiment of the present invention during a second phase of the transition from the blocking situation into a non-blocking situation.
Figure 7:
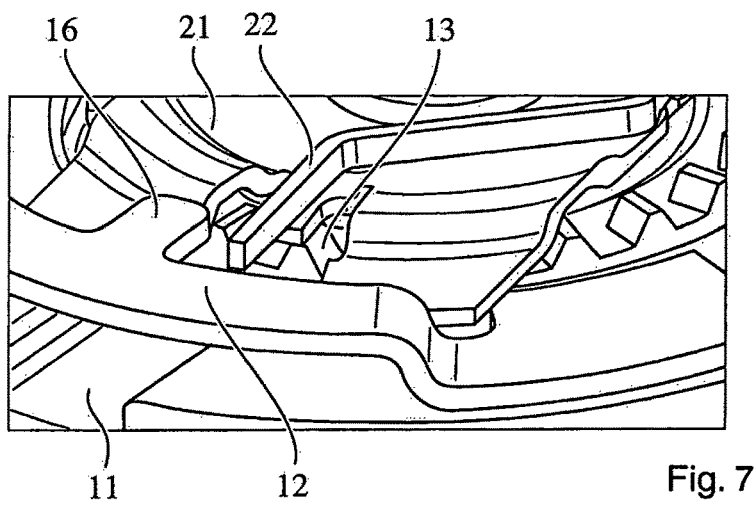
FIG. 7 shows a sixth schematic cross-sectional view from the blocking region of an adjuster device according to the exemplary first embodiment of the present invention during a third phase of the transition from the blocking situation into a non-blocking situation, wherein the path for the disengaging movement has been released for the blocking spring element.

FIGS. 5, 6 and 7 illustrate three schematic cross-sectional views from the blocking region of an adjuster device 1 according to the exemplary embodiment of the present invention during the transition from the blocking situation into a non-blocking situation. It is provided that the adapter plate is rotated for the transition from the blocking situation into a non-blocking situation. It is conceivable here for the actuation of the adapter plate to take place directly here via a handle or lever or indirectly via a cable pull or the like. Furthermore, it is provided that the adapter plate, as the latter rotates, moves the adjustable part and therefore also the toothed structure therewith without an additional idling distance. It can be seen in FIG. 5 how a first tooth comes into contact with the projection. At the same time, the adapter plate and therefore also the adapter plate web and in particular the blocking bolt are moved therewith, specifically in such a manner that the blocking bolt and the blocking spring element can no longer interact in a form-fitting manner in a direction running parallel to the central axis. In other words: in a secondary position, the adapter plate releases the path for the blocking spring element 22 for a movement in a direction running parallel to the central axis, i.e. the adapter plate permits a disengaging movement. The disengaging movement is caused by the movement of the toothed structure by the ramp interacting with the projection. As a result, the projection and therefore also the blocking spring element are pressed upward within the context of the disengaging movement. While FIG. 6 shows a torque absorption at a time at which the blocking bolt permits the disengaging movement and the disengaging movement has been approximately half carried out, FIG. 7 illustrates a torque absorption at a later time at the temporal end of the disengaging movement. When the disengaging movement has finished, the second locking device is in the non-blocking situation, and the projection of the blocking element base plate is not capable of interacting in a form-fitting manner with the teeth of the toothed structure of the adjustable part. As a result, in the non-blocking situation, the adjustable element 10 is not prevented from being adjusted or rotated relative to the fixed element 20.

Figure 8:
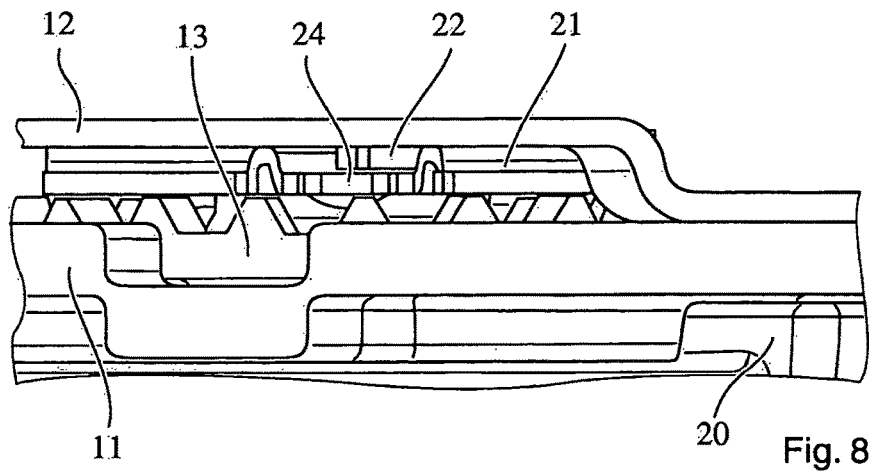
FIG. 8 shows a seventh schematic cross-sectional view from the blocking region of an adjuster device according to the exemplary first embodiment of the present invention after a disengaging movement is finished.
Figure 9:
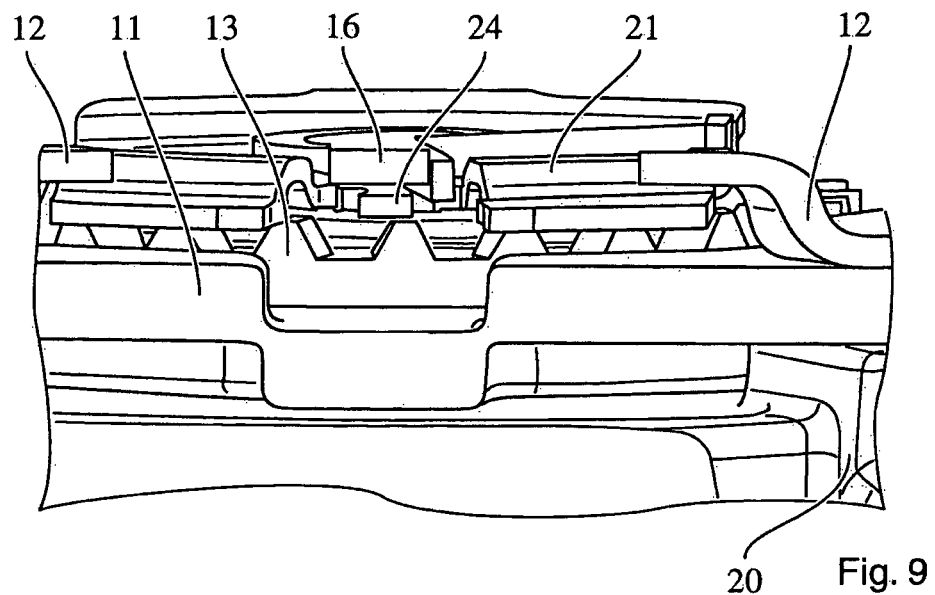
FIG. 9 shows an eighth schematic cross-sectional view from the blocking region of an adjuster device according to the exemplary first embodiment of the present invention after the disengaging movement is finished, wherein the alignment of the adapter plate corresponds to an unactuated alignment position.
Figure 10:
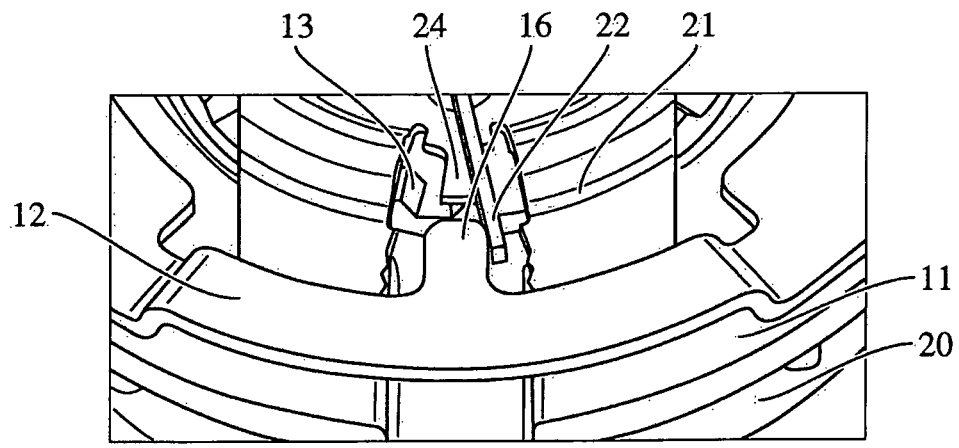
FIG. 10 shows a ninth schematic cross-sectional view from the blocking region of an adjuster device according to the exemplary first embodiment of the present invention after the disengaging movement is finished, wherein the adapter plate corresponds to an unactuated alignment position.

FIGS. 8, 9 and 10 illustrate three schematic cross-sectional views from the blocking region of an adjuster device 1 according to the exemplary embodiment of the present invention after the disengaging movement is finished. FIG. 8 shows that, in the non-blocking situation, the projection of the blocking element base plate is arranged above the teeth of the toothed structure. By raising the projection and the blocking spring element, the blocking bolt and the blocking spring element are then located in one plane. Driven by the spiral spring, the adapter plate returns into the position of the primary position. As a result, the blocking bolt presses the blocking spring to the side. Since the blocking bolt is pretensioned by the spiral spring via the adapter plate, the returned blocking bolt secures the blocking spring element in a common plane. The securing also causes the projection of the blocking element base plate to remain above the teeth of the toothed structure. As a result, the adjustable element can be further rotated with the toothed structure thereof in an advantageous manner without the projection always slipping again between the teeth during the rotation of the toothed structure and thereby at least making the rotational movement of the adjustable part more difficult, if not even blocking said rotational movement.

Figure 11:
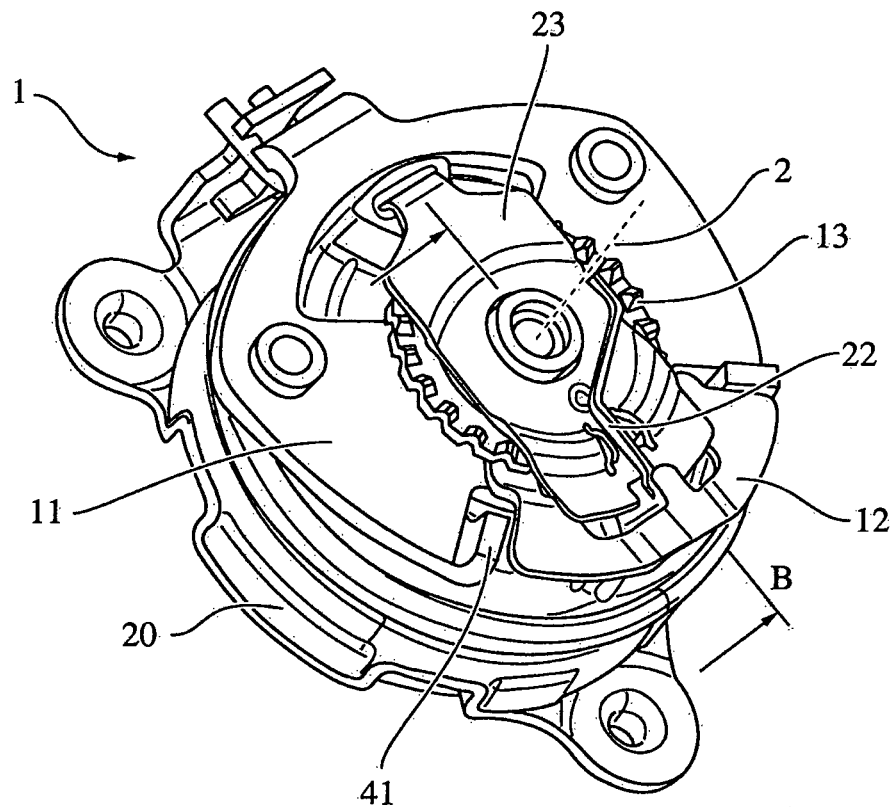
FIG. 11 shows a view of an adjuster device according to a second exemplary embodiment of the present invention.
Figure 12:
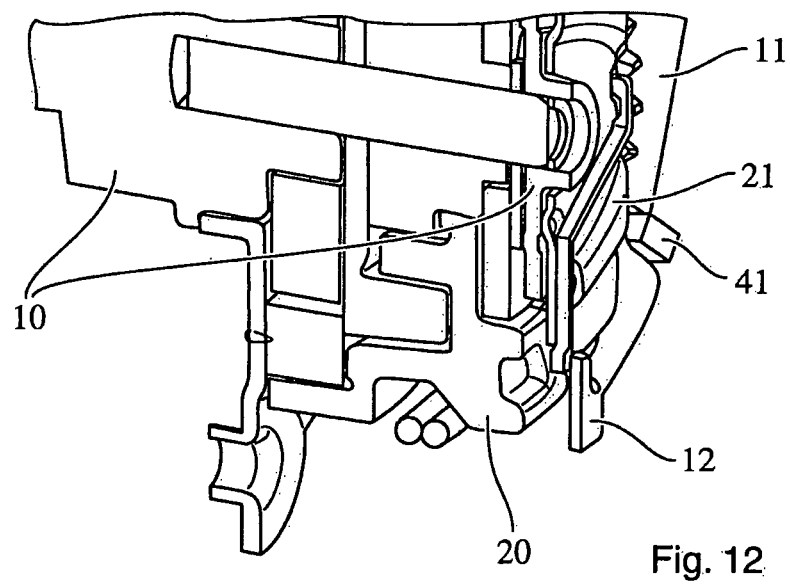
FIG. 12 shows a tenth schematic cross-sectional view along a plane which runs parallel to a central axis and parallel to the line B-B from FIG. 11.
Figure 13:
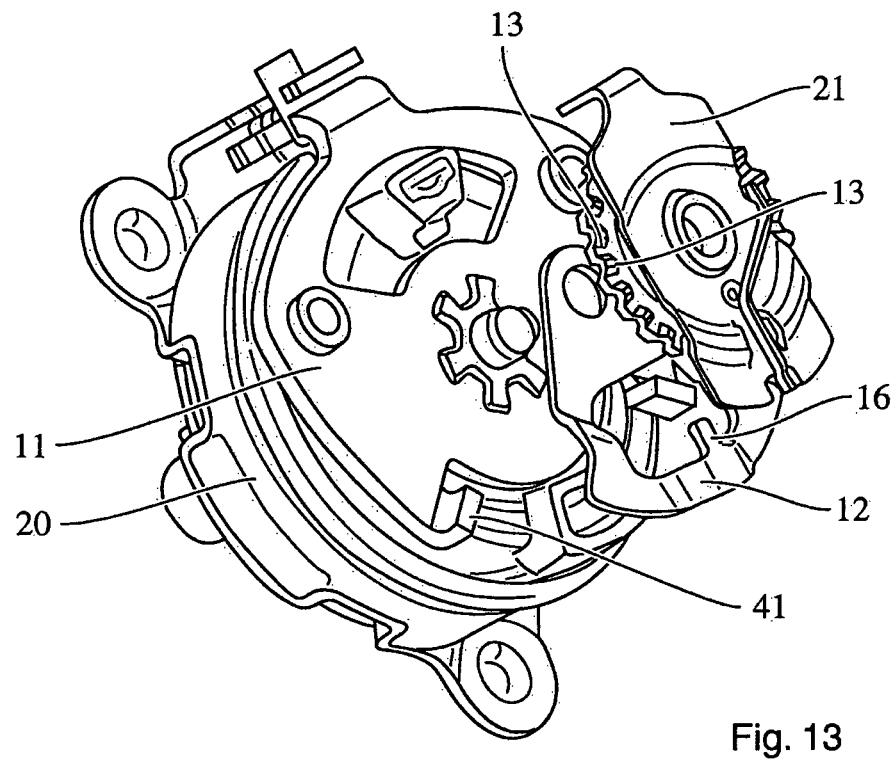
FIG. 13 shows an adjuster device according to the second exemplary embodiment of the present invention in an exploded illustration.

FIGS. 11, 12 and 13 illustrate schematic views of an adjuster device according to a second exemplary embodiment of the present invention for a motor vehicle component (not illustrated), wherein FIG. 11 shows a top view of the adjuster device 1, FIG. 12 shows a tenth schematic cross-sectional view along a plane of the adjuster device 1, which plane runs parallel to the central axis 2 and parallel to the line B-B from FIG. 11, and FIG. 13 shows the adjuster device in an exploded illustration. In the second exemplary embodiment, it is provided that the adapter plate 11 and the adapter plate web 12 are two separate components which are mounted rotatably about the central axis 2. In particular, it is provided in said second exemplary embodiment that the adapter plate 11 has a driver 41, wherein the driver 41 is formed by a projection on the adapter plate 11 in a direction running substantially parallel to the central axis 2. During a rotation of the adapter plate 11 about an angle of rotation predetermined by the configuration of adapter plate 11 and adapter plate web 12, the driver carries along the adapter plate web 12. FIG. 12 and show that the adapter plate web 12 in said second exemplary embodiment is substantially arranged between blocking element or adjustable element 10 and adapter plate, wherein the adapter plate 11 can interact in a form-fitting manner with the adapter plate web only by means of a rotational movement and, as a result, can be rotated. The adapter plate web furthermore has a blocking bolt 16 and is configured in such a manner that the blocking bolt 16 is arranged above the blocking spring element 22 in a direction parallel to the central axis 2. Furthermore, it is provided that the adjustable element 10 has a toothed structure 13 and is likewise mounted rotatably about the central axis 2. The toothed structure 13 is preferably rotated at the same time via the rotational movement of the first locking device, for example a friction brake. In particular, it is provided that the rotational movement of the adapter plate 11 brings about the rotation of the toothed structure of the adjustable element 13.

Figure 14:
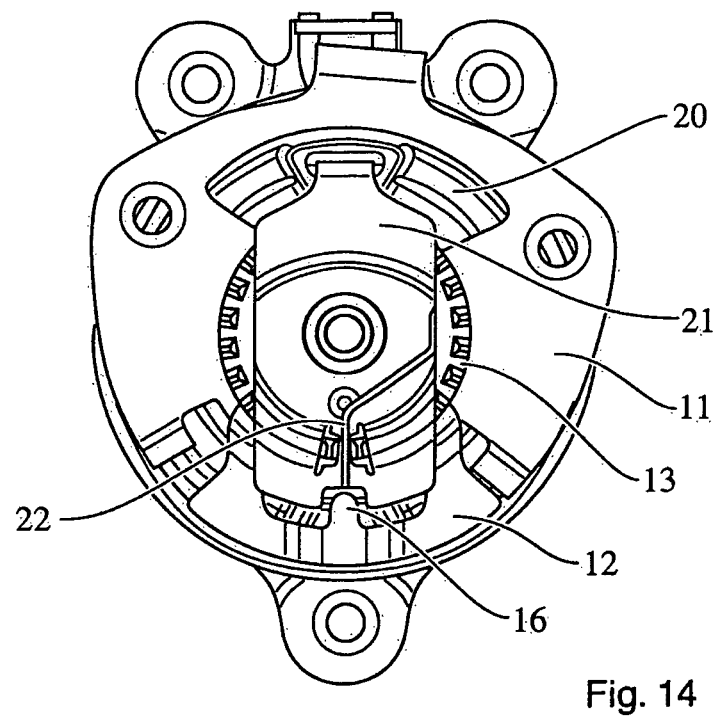
FIG. 14 shows an adjuster device according to the second exemplary embodiment with an adapter plate in a first alignment position.

FIG. 14 illustrates the adjuster device according to the second exemplary embodiment with the adapter plate in a first alignment position. The adapter plate 11 takes up said first alignment position, for example, if the adjuster device 1 is not actuated, i.e. in the blocking situation. In said blocking situation, the disengaging movement of the blocking element is prevented by the blocking bolt, and the toothed structure of the rotatable element does not move. It is conceivable in particular for the adapter plate to be rotated particularly easily in the first alignment position thereof, for example by 5° in comparison to an unactuated adapter plate alignment. Said position can therefore be taken up by the adapter plate 11 directly after the beginning of the actuation of the adjuster device. The unactuated adapter plate alignment is understood as meaning the adapter plate alignment which the adapter plate 11 takes up when the adjuster device 1 is not actuated.

Figure 15:
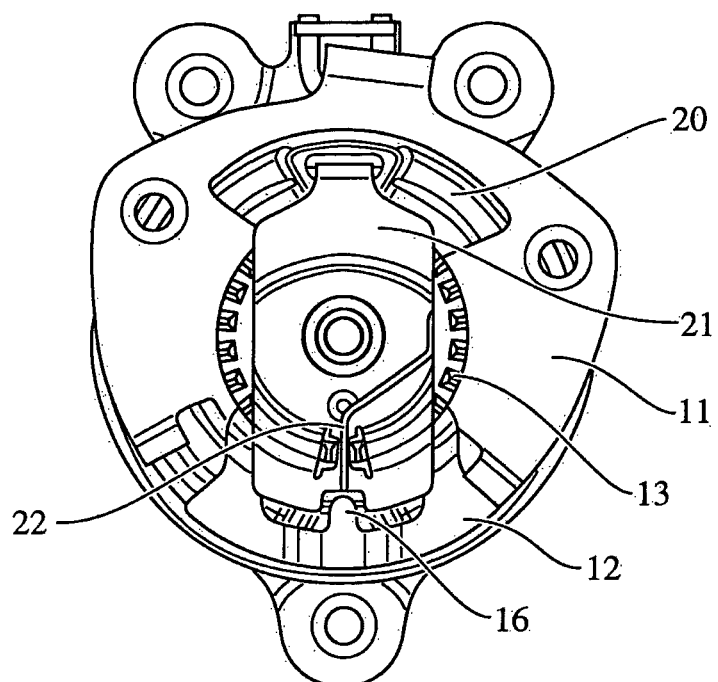
FIG. 15 shows an adjuster device according to the second exemplary embodiment with an adapter plate in a second alignment position.
Figure 16:
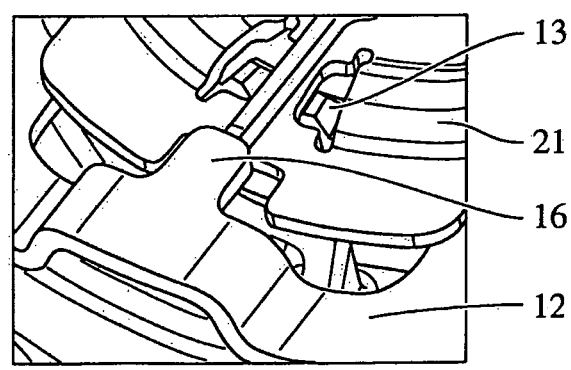
FIG. 16 shows an eleventh schematic cross-sectional view from the blocking region of an adjuster device 1 according to the second exemplary embodiment with an adapter plate in a second alignment position.

FIGS. 15 and 16 show the adjuster device 1 according to the second embodiment with the adapter plate 11 in a second alignment position. In the second alignment position, which is taken up temporally after the first alignment position when the adjuster device 1 is actuated, the toothed structure of the adjustable element 13 is already carried along, i.e. the toothed structure of the adjustable element 13 rotates. By means of the rotation of the toothed structure of the adjustable element 13, a force acts on the blocking spring element 22 in the direction of the disengaging movement. However, the disengaging movement of the blocking element 21 is prevented by the blocking bolt 16 of the unmoved adapter plate web 12. In other words, even if the adjustable element 10 has already moved, the adjuster device 1 is still not yet in the non-blocking situation. The blocking by the blocking bolt 16 is illustrated in enlarged form in FIG. 15. It is conceivable in particular for the adapter plate to be rotated in the second alignment position thereof by 7° in comparison to the unactuated adapter plate alignment.

Figure 17:
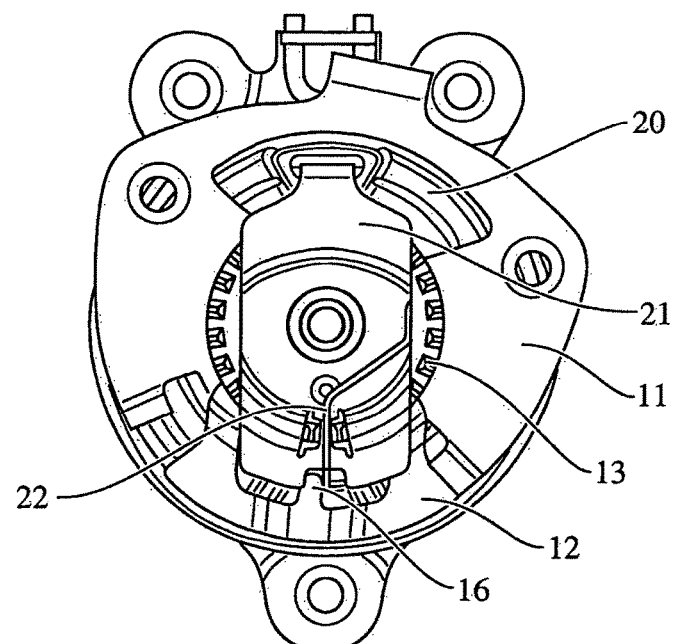
FIG. 17 shows an adjuster device according to the second exemplary embodiment with an adapter plate in a third alignment position.
Figure 18:
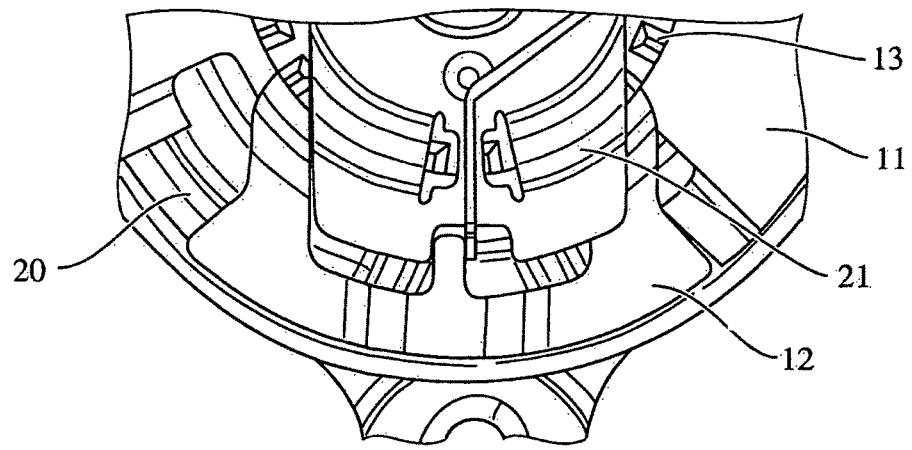
FIG. 18 shows a twelve schematic cross-sectional view from the blocking region of an adjuster device 1 according to the second exemplary embodiment with an adapter plate in a third alignment position.

FIGS. 17 and 18 show the adjuster device 1 according to the second embodiment with the adapter plate 11 in a third alignment position. In the third alignment position, which is taken up temporally after the second alignment position when the adjuster device 1 is actuated, the adapter plate 11 interacts in a form-fitting manner with the adapter plate web 12 such that the blocking bolt 16 is displaced and the path for the disengaging movement is released for the blocking element 21. Since the rotational movement, already begun previously in time, of the adjustable part 10, in particular of the toothed structure of the adjustable element 13, is continued even when the third alignment position of the adapter plate 11 is taken up, the blocking element 21 can execute the disengaging movement when the third alignment position of the adapter plate 11 is taken up. FIG. 18 clarifies this in an enlarged illustration of the blocking region of the adjuster device 1 according to the second exemplary embodiment of the present invention. It is conceivable in particular for the adapter plate 11 to be rotated in the third alignment position thereof by 10° in comparison to the unactuated adapter plate alignment.

Figure 19:
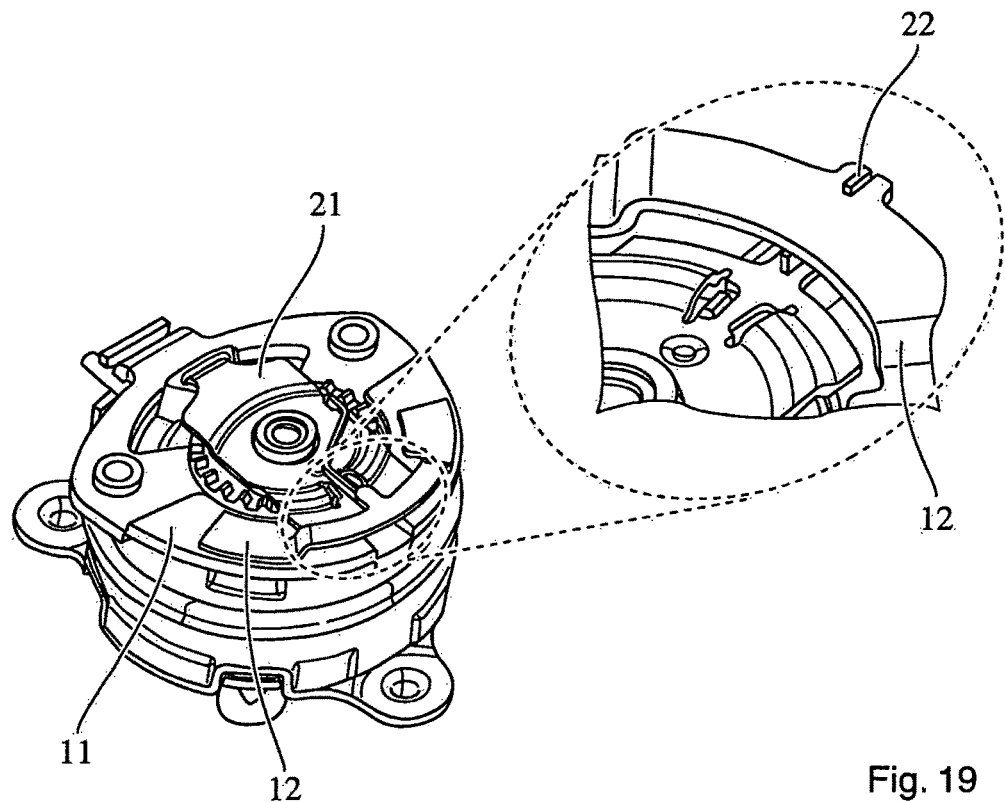
FIG. 19 shows an adjuster device according to a third embodiment of the present invention together with an enlarged illustration of the blocking region.

FIG. 19 illustrates an adjuster device 1 according to a third embodiment. In this embodiment, the blocking spring element 22 is arranged on the adapter plate web 12 and the blocking bolt 16 is arranged on the blocking element 21. It is provided here that the adapter plate web 12 is arranged on the adapter plate 11 for rotation therewith. The blocking region is illustrated in enlarged form in the dashed circle.

Figure 20:
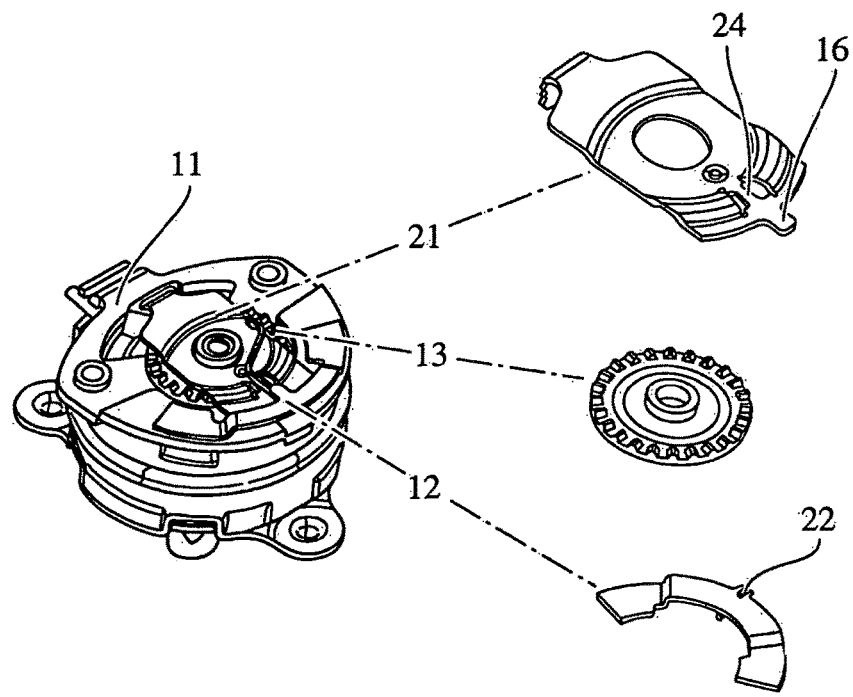
FIG. 20 shows an adjuster device according to the third embodiment of the present invention together with a blocking element, a toothed structure and an adapter plate web, which are in each case illustrated as an individual component.

FIG. 20 illustrates the adjuster device 1 according to the third embodiment, together with the corresponding configurations of the adapter plate web 12, the toothed structure 13 and the blocking element 21. The corresponding blocking element 21 has a blocking bolt 16 and a projection 24. Furthermore, the blocking element 21 is configured in such a manner that, in the mounted adjuster device 1, the projection 24 can be arranged between two teeth of the toothed structure 13. In addition, it is provided, for the embodiment illustrated, that the blocking bolt at least partially runs below the adapter plate web 12. In this embodiment, the adapter plate web 12 comprises the blocking spring element 22, wherein the blocking spring element 22 substantially runs below the adapter plate web 12. However, it is also conceivable for the blocking spring element 22 to be fixedly arranged on the adapter plate web 12 and for part of said blocking spring element not to be covered by the adapter plate web 12 in a direction running parallel to the central axis 2. The blocking spring element 22 is preferably arranged on the adapter plate web 12 in an integrally bonded, frictional and/or form-fitting manner. In the embodiment illustrated, the blocking spring element 22 is elastically deformable in a direction running perpendicular to the central axis 2.

Figure 21:
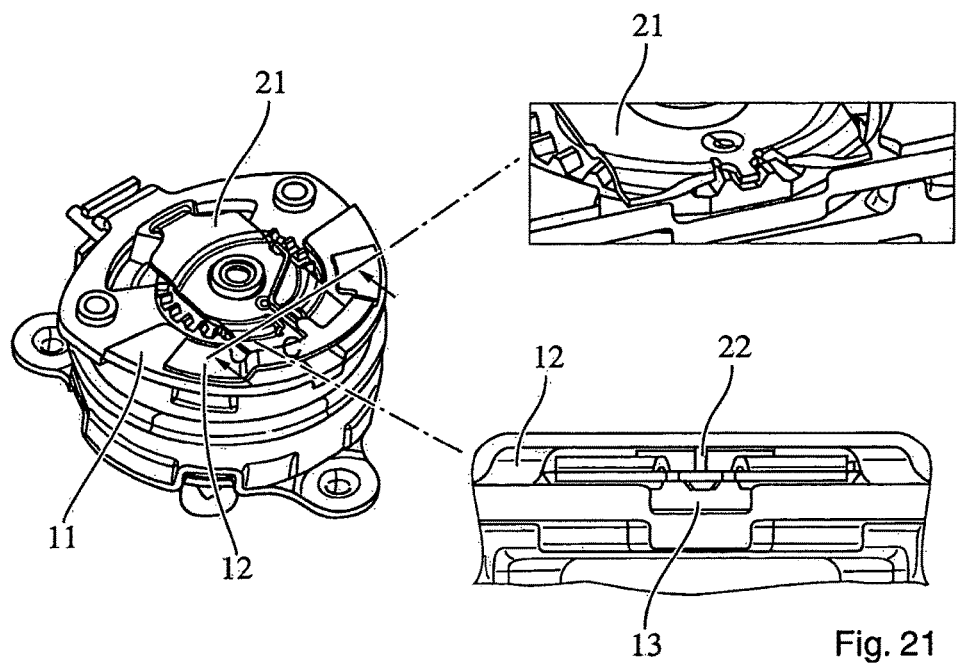
FIG. 21 shows an adjuster device according to the third embodiment of the present invention together with two enlarged illustrations of the blocking region from two perspectives, with an adapter plate in a position which the unactuated adapter plate takes up.

FIG. 21 illustrates the adjuster device 1 according to the third embodiment together with enlarged illustrations of the blocking region, in particular along the line C-C, when the adapter plate 11 is not actuated and the blocking position of the second locking device is taken up. In this embodiment, in the unactuated adapter plate position, the blocking spring element 22 is arranged above the blocking bolt 16 of the blocking element 21 in a direction running parallel to the central axis 2 when the blocking position is taken up. It is provided here that, in the blocking position, the blocking spring element 22 and the blocking bolt 16 interact in a form-fitting manner in a direction parallel to the central axis 2. The arrangement of blocking spring element 22 and blocking bolt 16 is shown in detail in the lower of the two enlarged illustrations of the blocking region. At which point of the adjuster device 1 in a plane perpendicular to the central axis 2 the form-fitting connection takes place is insignificant here. For example, in the blocking position, the blocking bolt 16 can interact in a form-fitting manner with the blocking spring element at a form-fitting point, wherein the form-fitting point is arranged below the adapter plate web 12 in a direction running parallel to the central axis 2.

However, it is also conceivable for the blocking bolt 16 and the blocking spring element 22 to be configured in such a manner that the form-fitting point is arranged between adapter plate web 12 and central axis 2. Since blocking bolt 16 and projection 24 of the blocking element 21 are connected rigidly to each other in the third embodiment, the form-fitting interaction of blocking bolt 16 and blocking spring element 22 prevents the blocking spring element 22 from being pivotable or partially releasable in a direction running parallel to the central axis. As a result, in the blocking position, the projection 24 of the blocking element 21 remains arranged between two teeth of the toothed structure 13 in such a manner that the toothed structure 13 and the projection 24 interact in a form-fitting manner in a direction running perpendicularly to the central axis 2 and thereby prevent the adjustable element 10 from running off in relation to the fixed element 20. The arrangement of projection 24 and toothed structure 13 is shown in the detail in the upper of the two enlarged illustrations of the blocking region.

Figure 22:
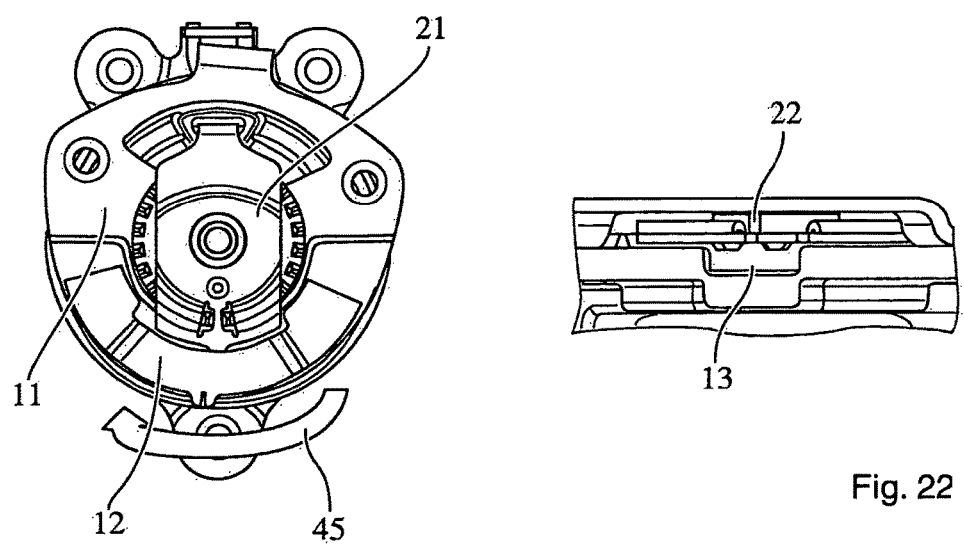
FIG. 22 shows an adjuster device according to the third embodiment of the present invention together with an enlarged illustration of the blocking region, wherein the adapter plate is in the first alignment position.

FIG. 22 illustrates the adjuster device 1 according to the third exemplary embodiment with the adapter plate 11 in the first alignment position. The adapter plate 11 takes up said first alignment position, for example, at the beginning of the actuation of said adapter plate. In this situation, the adjuster device 1 is in lost motion, i.e. the adjustable element 10 does not move in relation to the fixed element 20 despite the rotational movement of the adapter plate 11. It is conceivable in particular for the adapter plate 11 to be rotated in the first alignment position thereof by 5° in a direction of rotation 45 in comparison to the unactuated adapter plate alignment.

Figure 23:
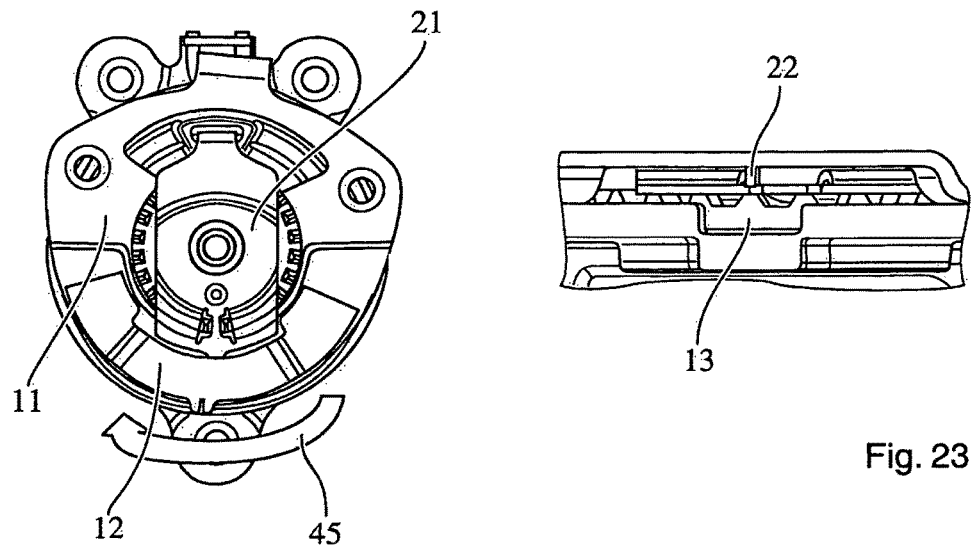
FIG. 23 shows an adjuster device according to the third embodiment of the present invention together with an enlarged illustration of the blocking region, wherein the adapter plate is in the second alignment position.

FIG. 23 illustrates the adjuster device 1 according to the third exemplary embodiment with the adapter plate 11 in the second alignment position. In the second alignment position, which is taken up temporally after the first alignment position when the adjuster device 1 is actuated, the adjustable part 10, in particular the toothed structure 13, begins to rotate. However, the disengaging movement of the blocking element 21 is prevented by the form-fitting interaction of the blocking block 16 on the blocking element 21 with the blocking spring element 22 on the adapter plate web 12, as is illustrated in detail in the enlarged illustration. In other words, even if the adjustable element 10 has already moved, the adjuster device 1 is not yet in the non-blocking situation. It is conceivable in particular for the adapter plate 11 to be rotated in the second alignment position thereof by 7° in comparison to the unactuated adapter plate alignment.

Figure 24:
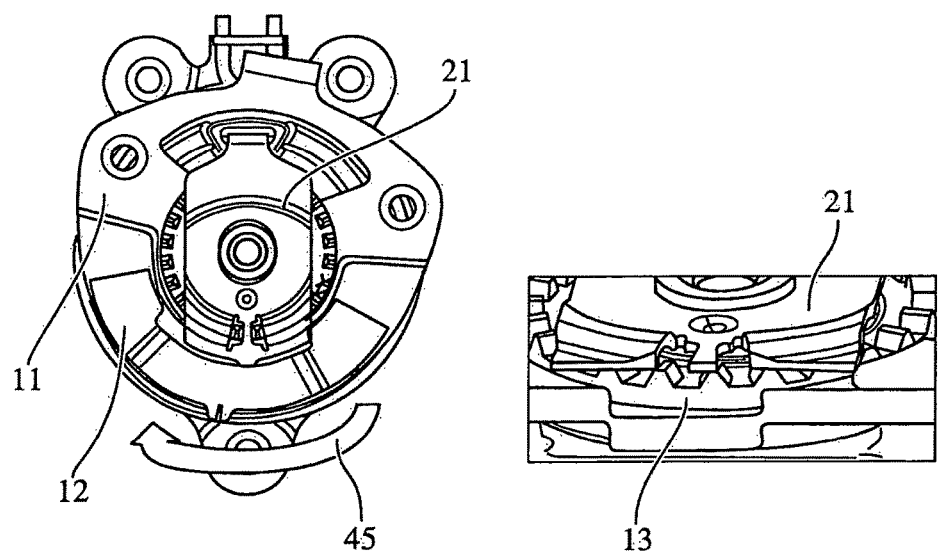
FIG. 24 shows an adjuster device according to the third embodiment of the present invention together with an enlarged illustration of the blocking region, wherein the adapter plate is in the third alignment position.

FIG. 24 shows the adjuster device 1 according to the third embodiment with the adapter plate 11 in a third alignment position. In the third alignment position, which is taken up temporally after the second alignment position when the adjuster device 1 is actuated, the path for the disengaging movement is released for the blocking bolt 16 on the blocking element 21 and the rotational movement of the adjustable element 10 brings about the disengaging movement. FIG. 24 clarifies this in detail with reference to an enlarged illustration of the blocking region of the adjuster device 1 according to the third embodiment of the present invention. It is conceivable in particular for the adapter plate 11 to be rotated in the third alignment position thereof by 10° in comparison to the unactuated adapter plate alignment.

Figure 25:
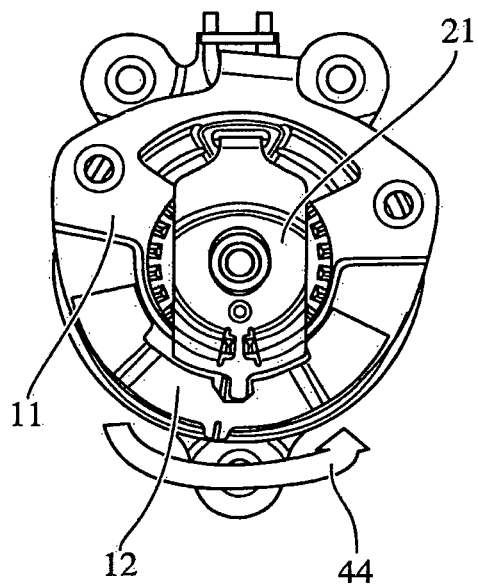
FIG. 25 shows an adjuster device according to the third embodiment after the disengaging movement is finished, during the return of the adapter plate into a position which the unactuated adapter plate takes up.

FIG. 25 illustrates the adjuster device 1 according to the third embodiment, after the disengaging movement has finished, in a non-blocking position when the adapter plate 11 follows a reversing movement 44. Such a reversing movement 44 can be brought about, for example, by the spiral spring 25, the restoring force of which transfers the adapter plate 11 into a position which the adapter plate takes up when the adjuster device 1 is not actuated. In the illustrated situation of the adjuster device 1, the adjuster device 1 is in a non-blocking position. In particular, under these conditions, it is provided that the blocking spring element 22 and the blocking bolt 16 are at least partially arranged in a common plane running perpendicularly to the central axis 2.

Figure 26:
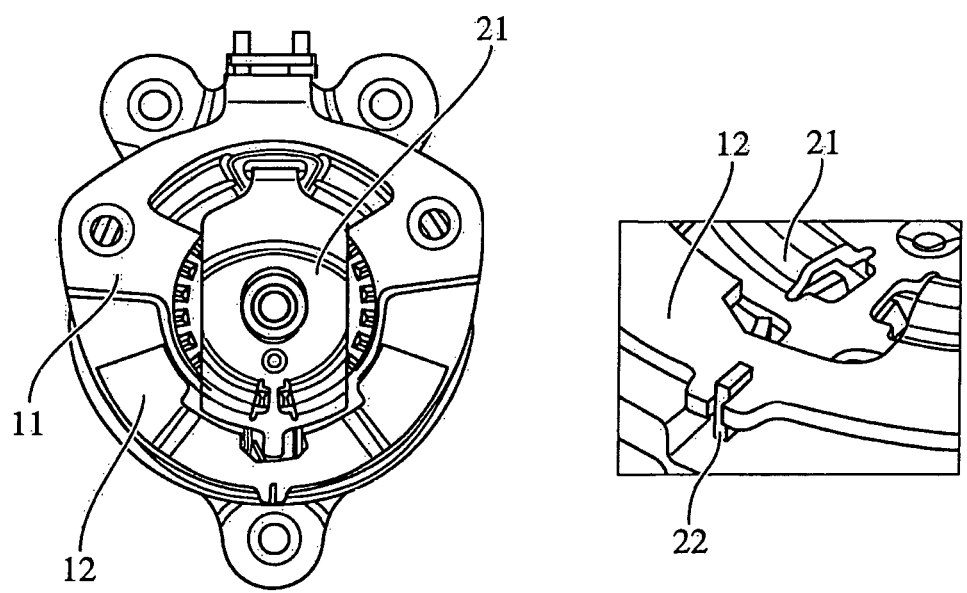
FIG. 26 shows an adjuster device according to the third embodiment together with an enlarged illustration of the blocking region after the disengagement movement is finished and after the adapter plate has returned into a position which the unactuated adapter plate takes up.

FIG. 26 illustrates the adjuster device 1 according to the third embodiment, after the disengaging movement has finished, in a non-blocking position when, in addition, the reversing movement 44 has finished and the adapter plate 11 takes up a position which the unactuated adapter plate also takes up. If, in the non-blocking position, the adapter plate 11 is in the position of the unactuated adapter plate, the blocking spring element 22 interacts frictionally with the blocking bolt 16 in such a manner that the blocking element 21 is prevented from undertaking an engaging movement. As illustrated in the enlarged illustration, it is conceivable here for the blocking spring element 22 to be elastically deformed in a direction perpendicular to the central axis 2 and for the restoring force of the blocking spring element 22 to assist the frictional interaction of blocking bolt 16 and blocking spring element 22.

Figure 27:
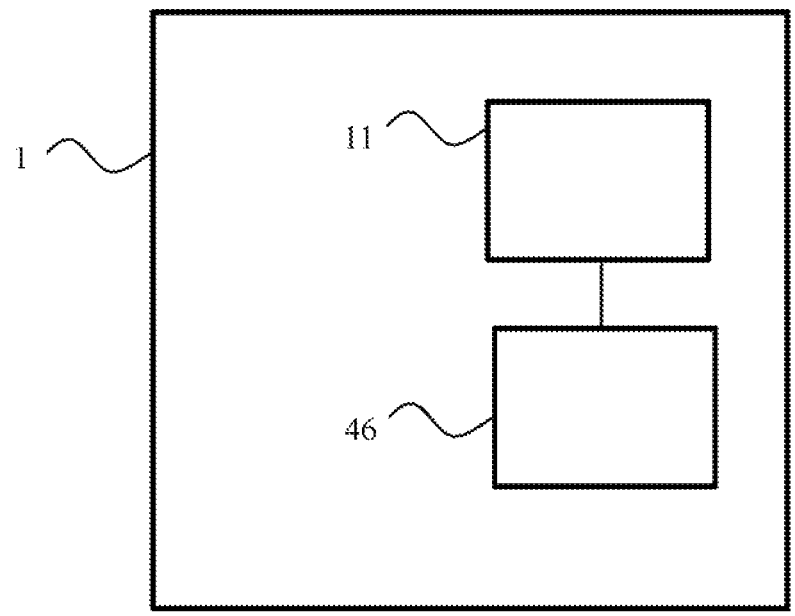
FIG. 27 shows an adjuster device having a lever operatively connected to the adapter plate.

FIG. 27 illustrates an adjuster device 1 with a lever 46 operatively connected to an adapter plate 11. The lever 46 is operatively connected in such a manner that when the lever is actuated, the adapter plate 11 is rotated.

Figure 28:
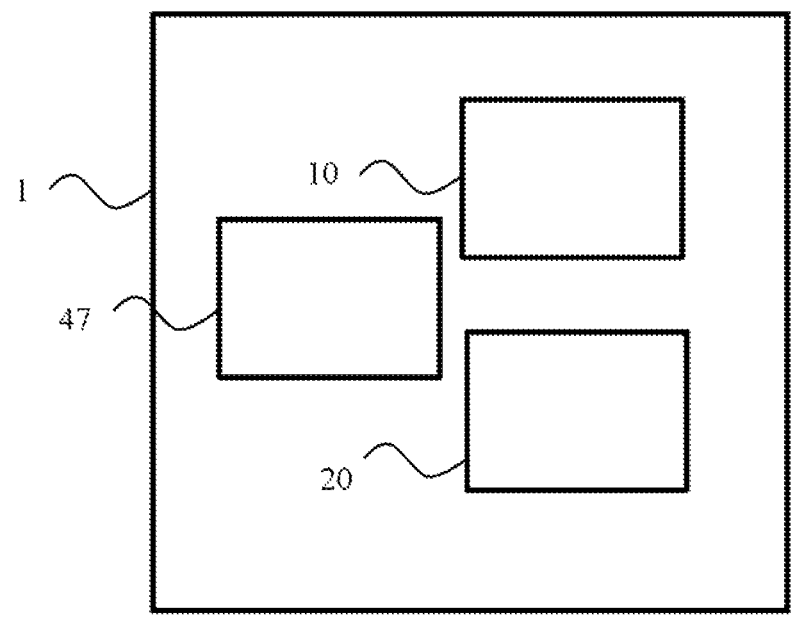
FIG. 28 shows an adjuster device having a fixed element, an adjustable element, and a first locking device.

FIG. 28 illustrates an adjuster device 1 having an adjustable element 10, a fixed element 20, and a first locking device 47. The adjustable element 10 is lockable relative to the fixed element 20 by the first locking device 47.

LIST OF REFERENCE SIGNS

1 Adjuster device
2 Central axis
4 Tab
5 Fastening device
10 Adjustable element
11 Adapter plate
12 Adapter plate web
13 Toothed structure of the adjustable element
16 Blocking bolt
20 Fixed element
21 Blocking element
22 Blocking spring element 23 Blocking element base plate
24 Projection
25 Spiral spring
26 Recess
27 Further tab
30 Clearance
40 Blocking region
41 Driver
44 Reversing movement
45 Direction of rotation
46 Lever
47 First locking device

The invention claimed is:

1. An adjuster device having a fixed element, an adjustable element, and a first locking device,
   wherein the adjustable element is mounted rotatably about a central axis relative to the fixed element, and the adjustable element is lockable relative to the fixed element by the first locking device,
   wherein the adjuster device has a second locking device for run off protection,
   wherein the second locking device comprises an adapter plate and a blocking element,
   wherein the blocking element is arranged non rotatably on the fixed element and the adapter plate is arranged rotatably about the central axis,
   wherein, in a blocking situation, a disengaging movement of the blocking element along an axis running parallel to the central axis is prevented by the adapter plate,
   wherein the adjustable element is drivable via the adapter plate such that a rotation of the adapter plate is synchronized with a rotation of the adjustable element,
   wherein the adapter plate and the adjustable element are configured in such a manner that, during a transition from the blocking situation into a non blocking situation, the adapter plate releases a path for the disengaging movement of the blocking element, and the adjustable element is drivable in such a manner that the rotation of the adjustable element brings about the disengaging movement of the blocking element,
   wherein the adjustable element is rotatable relative to the fixed element before the disengaging movement is released for the blocking element,
   wherein the adjustable element has a toothed structure,
   wherein, in the blocking situation, the tooth structure interacts with the blocking element in a direction perpendicular to the central axis such that the rotation of the adjustable element about the central axis is restricted,
   wherein during the transition from the blocking situation into the non blocking situation, the rotation of the adjustable element brings about the disengaging movement through the toothed structure,
   wherein the adapter plate comprises a blocking spring element,
   wherein, in the blocking situation, the blocking spring element interacts with the blocking element to prevent the disengaging movement of the blocking element along the axis running parallel to the central axis and, in the non blocking situation, the blocking spring element contacts the blocking element such that an engaging movement of the blocking element and a transition from the non blocking situation to the blocking situation is prevented.

2. The adjuster device as claimed in claim 1, wherein the adjuster device comprises a spiral spring providing a resetting force acting on the adapter plate.

3. The adjuster device as claimed in claim 1, wherein a lever is operatively connected to the adapter plate in such a manner that, when the lever is actuated, the adapter plate is rotated.

* * * * *